United States Patent [19]

Weller

[11] Patent Number: 5,154,445
[45] Date of Patent: Oct. 13, 1992

[54] CONSTANT FORCE AIR CUSHION ARRANGEMENT FOR AUTOMOTIVE SIDE IMPACT PROTECTION

[75] Inventor: Peter A. Weller, Holland, Mich.

[73] Assignee: Davidson Textron Inc., Dover, N.H.

[21] Appl. No.: 764,343

[22] Filed: Sep. 23, 1991

[51] Int. Cl.$^5$ .............................................. B60R 21/04
[52] U.S. Cl. ..................... 280/751; 188/289
[58] Field of Search ............. 280/748, 751, 752, 730; 180/232; 293/133, 134; 188/289

[56] References Cited

U.S. PATENT DOCUMENTS

| | | | |
|---|---|---|---|
| 2,606,755 | 8/1952 | Samuels | 280/751 |
| 2,624,596 | 1/1953 | Clingman | 280/751 |
| 2,760,813 | 8/1956 | Colm | 280/751 |
| 3,791,667 | 2/1974 | Haviland | 280/730 |
| 3,815,703 | 6/1974 | De Lorean et al. | 180/232 |
| 4,426,109 | 1/1984 | Fike, Jr. | 293/133 |
| 4,934,749 | 6/1990 | Folarin | 293/134 |

Primary Examiner—Kenneth R. Rice
Attorney, Agent, or Firm—Reising, Ethington, Barnard, Perry & Milton

[57] ABSTRACT

A constant force air cushion arrangement for side impact protection, including a plurality of air cells mounted on the inner door panel. A tapered stem is integrally molded on the inner surface of each cell so as to extend toward the inner door panel. An orifice opening, which may have a diaphragm mounted therein, is formed in a wall of each cell adjacent the distal end of the tapered stem. In the event of a side impact of a predetermined force, the stem enters the orifice opening, either directly, or by bursting through the diaphragm in response to the relative velocity between the door and an occupant to progressively restrict the orifice opening and, hence, the volume of air forced out through the orifice by a progressively decreasing velocity between the door and the occupant.

6 Claims, 1 Drawing Sheet

U.S. Patent  Oct. 13, 1992  5,154,445
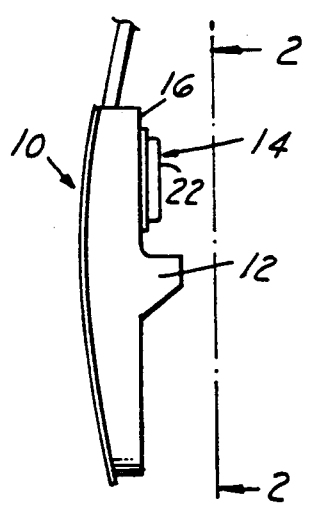
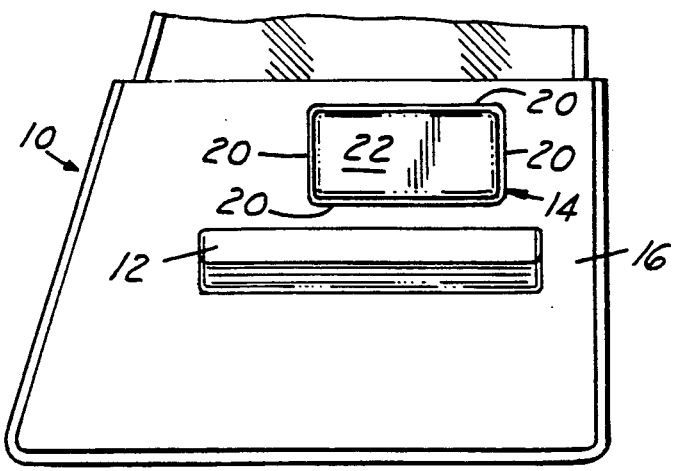
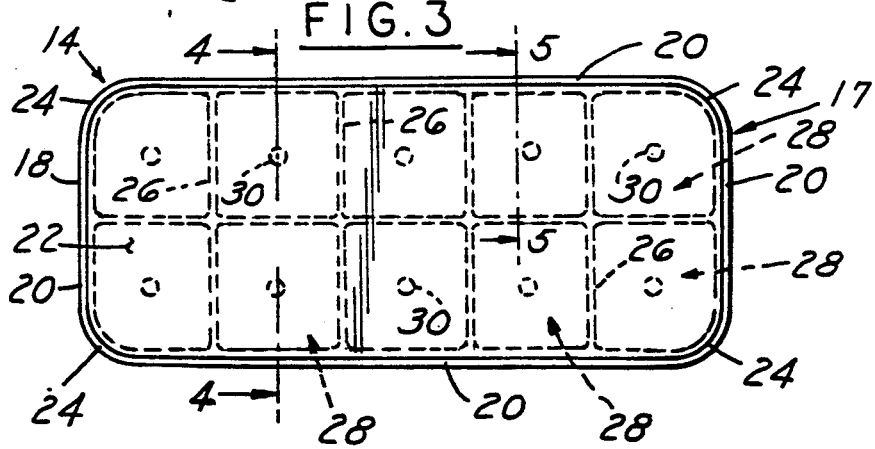
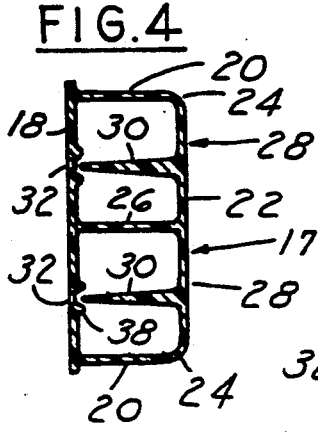
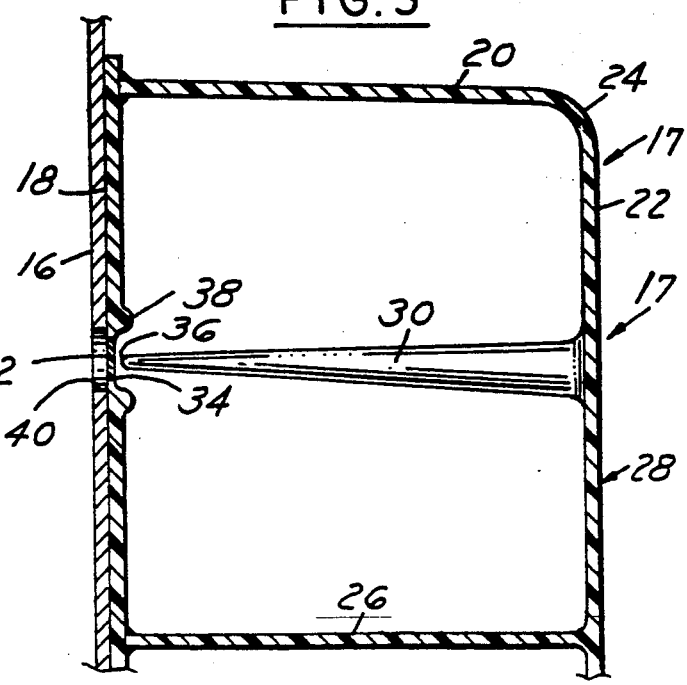

CONSTANT FORCE AIR CUSHION ARRANGEMENT FOR AUTOMOTIVE SIDE IMPACT PROTECTION

TECHNICAL FIELD

This invention relates generally to automotive side impact protection apparati and, more particularly, to a constant force air cushion arrangement for side impact protection.

BACKGROUND ART

Heretofore, various types of air bag devices have been suggested for mounting in the doors, seats or ceilings of the vehicle, adaptable to being inflated should a side impact occur to cushion the operator or passenger. One such arrangement is disclosed in Haviland U.S. Pat. No. 3,791,667. Such side impact apparati are not known to include a constant force type air cushion.

De Lorean U.S. Pat. No. 3,815,703 discloses an energy absorber unit associated with vehicle bumper system, including a diaphragm associated with a container of pressurized fluid medium, wherein the diaphragm is adapted to being ruptured by a piercing rod upon impact beyond a predetermined force, to permit the fluid medium to flow into an inflatable cushion.

Fike, Jr. U.S. Pat. No. 4,426,109 discloses a shear relief device and a tapered grommet mounted in a relief opening, with a tapered rod extended through the grommet and, for a mild impact, adapted to progressively restrict flow of fluid from one chamber to another and, in the event of a heavy impact, to engage the inner periphery of the grommet and remove the shear relief device and grommet, assuring that shock absorption continuously occurs.

Folarin U.S. Pat. No. 4,934,749 discloses a tapered metering pin extending through a flow control orifice formed in a cap and cooperating therewith to progressively restrict the flow of fluid from a rear chamber to an intermediate chamber to absorb the impact energy upon a bumper impact causing the cap to move rearwardly past the metering pin.

DISCLOSURE OF THE INVENTION

A general object of the invention is to provide an improved automotive side impact apparatus.

Another object of the invention is to provide an automotive side impact apparatus including a constant force air cushion arrangement.

A further object of the invention is to provide a constant force air cushion arrangement for side impact protection, wherein a cushion mounted on an inner door panel includes a plurality of fluid pressure enclosed cells having a tapered orifice control stem molded onto the inner surface of the outer wall of each cell and extended so as terminate close to a diaphragm mounted in the center of the inner wall adjacent an opening formed in the inner door panel, adapted to burst through the diaphragm at a selected force level, such that constant air bleed velocity results from an initial high volume flow and maximum orifice area through a progressively decreasing volume flow and orifice area as relative door and body velocity decreases and deflection increases. Alternatively, the orifice may be left open, i.e., having no diaphragm mounted therein, with air maintained in the cells either naturally, or by an air pump or by conical springs in each cell.

These and other objects and advantages of the invention will become more apparent when reference is made to the following description and accompanying drawings.

BRIEF DESCRIPTION OF THE DRAWINGS

FIG. 1 is a fragmentary end view of an automotive door embodying the invention;

FIG. 2 is a side view taken along the plane of the line 2—2 of FIG. 1, and looking in the direction of the arrows;

FIG. 3 is an enlarged view of a portion of the FIG. 2 structure;

FIG. 4 is a cross-sectional view taken along the plane of the line 4—4 of FIG. 3, and looking in the direction of the arrows; and FIG. 5 is an enlarged fragmentary view of a portion of the FIG. 4 structure.

BEST MODE OF CARRYING OUT THE INVENTION

Referring now to the drawings in greater detail, FIGS. 1 and 2 illustrate an automotive door 10 having an arm rest 12 and the air cushion assembly 14 of the invention mounted on the inner panel 16 thereof.

As shown in FIGS. 3-5, the cushion assembly 14 includes a hollow flexible skin 17 having a flat inner wall 18 secured to the inner door panel 16 (FIG. 5), with four side walls 20 and an integral outer wall 22 secured in any suitable manner to the flat inner wall, so as to project toward an adjacent seated operator or passenger (not shown). The edges 24 between the side and outer walls are rounded substantially as shown.

Molded integrally with the outer wall 22 are a plurality of cell walls 26 dividing the cushion assembly 14 into a predetermined number of air-filled cells 28, say, ten, as shown in FIG. 3. An orifice control stem 30 is molded integrally with the outer wall 22 at the center of each cell 28, extending into close proximity with the inner wall 18.

A diaphragm 32 may be mounted so as to seal off a orifice opening 34 formed in the inner wall 18 adjacent the distal end 36 of the stem 30. A reinforcement ring 38 is formed around the edge of the opening 34. A hole 40 is formed in the inner panel 16 of the door 10 adjacent the diaphragm 32.

In the event of a side impact, it is desirable to have a constant force between the door and an adjacent operator or passenger. More specifically, with a constant force, at the beginning of the impact where the difference in velocity between the door 10 and the operator's or passenger's body (not shown) is the highest, a large orifice 34 diameter is required because, with constant pressure and thus constant air bleed velocity, the outer wall 22 of the cushion assembly 14 must deflect at a rate equal to this maximum velocity difference requiring the highest volume flow and the largest area. Then, as the velocity difference decreases, the orifice 34 area must decrease to reduce the volume flow accordingly and maintain the pressure or force. Thus, the orifice 34 area must decrease as deflection increases.

In operation, under impact, the orifice control stem 30 is pushed into the orifice opening 34 or, if a diaphragm 32 is present, bursting it and then continuing to move through the orifice 34, reducing the area as the cushion wall 22 deflects in accordance with a predetermined schedule to maintain constant force.

At lower initial impact velocities, the force level will be lower because the orifice 34 area schedule is fixed as a function of cushion wall 22 deflection. Lower velocity means lower air volume flow through the orifice 34. Air volume is air velocity times orifice area. With a given orifice 34 area, lower air volume means lower air velocity and thus lower pressure or force.

INDUSTRIAL APPLICABILITY

It should be apparent that the invention provides an efficient, compact air cushion assembly capable of providing a desirable constant force between the automotive door and an operator or passenger in the event of a side impact against the vehicle. Constant force is desirable in order to absorb the maximum amount of impact energy at the lowest acceptable force.

While but two general embodiments of the invention have been shown and described, other modifications thereof are possible within the scope of the following claims.

The embodiments of the invention in which an exclusive property or privilege is claimed are defined as follows:

1. For use with an automotive inner door panel, an air cushion assembly comprising a plurality of air cells secured to said inner door panel, an orifice formed in each of said air cells adjacent said inner door panel, and stem means operatively connected to each of said air cells for entering said orifice upon a side impact of a predetermined force and progressively restricting said orifice area and hence, the volume of air forced therethrough, as the deflection of said air cells between said inner door and an adjacent operator or passenger increases.

2. The air cushion assembly described in claim 1, wherein said stem means includes a tapered orifice control stem formed on the inner surface of each cell and extending to within a close proximity to said orifice, and an opening formed in said inner door panel adjacent said orifice.

3. The air cushion assembly described in claim 2, and a diaphragm mounted in each of said orifices, with said tapered orifice control stem extending to within a close proximity to said diaphragm and adapted to burst said diaphragm upon a side impact.

4. For use with an automotive inner door panel, an air cushion assembly comprising a plurality of air cells having an inner wall thereof secured to the inner door panel and sides and an exposed wall extended toward an operator or passenger, a tapered orifice control stem formed on the inner surface of the exposed wall of each cell and extended toward the inner wall, a diaphragm mounted in an orifice opening formed in the inner wall adjacent the distal end of the orifice control stem, and a hole formed in the inner door panel adjacent the orifice opening and diaphragm.

5. The air cushion assembly described in claim 4, and a reinforcement ring molded on the inner wall around said orifice opening.

6. The air cushion assembly described in claim 4, wherein each tapered orifice control stem is integrally molded on the inner surface of the exposed wall of each cell.

* * * * *